(12) United States Patent
Yamashita

(10) Patent No.: US 11,753,973 B2
(45) Date of Patent: Sep. 12, 2023

(54) EXHAUST APPARATUS

(71) Applicant: SUZUKI MOTOR CORPORATION, Hamamatsu (JP)

(72) Inventor: Kohei Yamashita, Hamamatsu (JP)

(73) Assignee: SUZUKI MOTOR CORPORATION, Hamamatsu (JP)

( * ) Notice: Subject to any disclaimer, the term of this patent is extended or adjusted under 35 U.S.C. 154(b) by 0 days.

(21) Appl. No.: 17/701,494

(22) Filed: Mar. 22, 2022

(65) Prior Publication Data

US 2022/0372900 A1 Nov. 24, 2022

(30) Foreign Application Priority Data

May 19, 2021 (JP) .................................. 2021-084683

(51) Int. Cl.
*F01N 1/08* (2006.01)

(52) U.S. Cl.
CPC .......... *F01N 1/089* (2013.01); *F01N 2490/04* (2013.01); *F01N 2560/025* (2013.01); *F01N 2590/04* (2013.01)

(58) Field of Classification Search
CPC ...... F01N 1/083; F01N 1/089; F01N 2590/02; F01N 2590/04; F01N 2590/06
See application file for complete search history.

(56) References Cited

U.S. PATENT DOCUMENTS

| | | | | |
|---|---|---|---|---|
| 6,250,075 | B1* | 6/2001 | Funakoshi | F01N 1/089 60/299 |
| 2008/0286167 | A1* | 11/2008 | Cho | B01D 53/9454 422/179 |
| 2018/0202335 | A1* | 7/2018 | Matsumoto | F01N 1/089 |
| 2018/0202343 | A1* | 7/2018 | Matsumoto | F01N 13/008 |
| 2019/0032530 | A1* | 1/2019 | Mach | F01N 1/089 |

FOREIGN PATENT DOCUMENTS

| | | | | |
|---|---|---|---|---|
| CN | 105464754 | A * | 4/2016 | |
| EP | 3064722 | A1 | 9/2016 | |
| JP | 59-82517 | A | 5/1984 | |
| JP | 2016-160915 | A | 9/2016 | |
| KR | 101268046 | B1 * | 5/2013 | F01N 1/083 |

OTHER PUBLICATIONS

Extended European Search Report dated Sep. 2, 2022, issued by the European Patent Office in corresponding application EP 22162888.6.

* cited by examiner

*Primary Examiner* — Jonathan R Matthias
(74) *Attorney, Agent, or Firm* — Stein IP, LLC

(57) ABSTRACT

An exhaust apparatus includes a chamber disposed below an engine, an inlet pipe guiding exhaust gas from an exhaust pipe to the chamber, a tail pipe discharging the exhaust gas from the chamber to an outside, a first partition wall partitioning an inside of the chamber to a pair of left and right spaces, and a second partition wall partitioning one of the left and right spaces to a pair of front and rear spaces. Another of the left and right spaces is a first expansion chamber into which the inlet pipe enters. A rear space of the front and rear spaces is a second expansion chamber disposed downstream of the first expansion chamber. A front space of the front and rear spaces is a third expansion chamber disposed downstream of the second expansion chamber, and the tail pipe enters into the front space.

6 Claims, 8 Drawing Sheets

EXHAUST APPARATUS

CROSS-REFERENCE TO RELATED APPLICATIONS

The disclosure of Japanese Patent Application No. 2021-084683 filed on May 19, 2021, including specification, drawings and claims is incorporated herein by reference in its entirety.

BACKGROUND

The present invention relates to an exhaust apparatus.

In an exhaust system of a straddle-type vehicle, a silencing chamber is provided downstream of an exhaust pipe that extends from an engine. When the exhaust gas flows into the chamber from the exhaust pipe, the exhaust gas is expanded in the chamber and energy of an exhaust sound is attenuated. As an exhaust apparatus of this type, an exhaust apparatus in which a chamber is disposed below an engine is known (for example, see Patent Literature 1). A plurality of expansion chambers are formed by partition walls inside the chamber described in Patent Literature 1, and after expansion of the exhaust gas is repeated in a process of passing through the plurality of expansion chambers, the exhaust gas is discharged to an outside from the downstream expansion chamber through a tail pipe.

Patent Literature 1: JP-A-2016-160915

SUMMARY OF INVENTION

According to one advantageous aspect of the invention, there is provided an exhaust apparatus configured to purify exhaust gas exhausted from an engine through an exhaust pipe, the exhaust apparatus including:

a chamber disposed below the engine;

an inlet pipe configured to guide exhaust gas from the exhaust pipe to the chamber;

a tail pipe configured to discharge the exhaust gas from the chamber to an outside;

a first partition wall partitioning an inside of the chamber to a pair of left and right spaces; and a second partition wall partitioning one of the pair of left and right spaces to a pair of front and rear spaces, wherein another of the pair of left and right spaces is defined as a first expansion chamber into which the inlet pipe enters, a rear space of the pair of front and rear spaces is defined as a second expansion chamber disposed downstream of the first expansion chamber, and a front space of the pair of front and rear spaces is defined as a third expansion chamber disposed downstream of the second expansion chamber, and the tail pipe enters into the third expansion chamber.

DETAILED DESCRIPTION OF EXEMPLIFIED EMBODIMENTS

Since the chamber described in Patent Literature 1 is disposed below the engine, there is a case where a volume of the chamber cannot be sufficiently secured in relation to a bank angle or surrounding components. Although a silencing measure is taken by forming a plurality of expansion chambers inside the chamber, it is difficult to secure a large volume of the plurality of expansion chambers in a limited space below the engine because of a structure in which the plurality of expansion chambers are arranged in a front-rear direction. Therefore, the exhaust gas may not be fully expanded, and a silencing effect may be reduced.

The present invention has been made in view of the above circumstances, and an object thereof is to provide an exhaust apparatus that can obtain a sufficient silencing effect by effectively utilizing a limited space.

An exhaust apparatus according to an aspect of the present invention purifies exhaust gas exhausted from an engine through an exhaust pipe. A chamber is disposed below the engine, the exhaust gas is guided from the exhaust pipe to the chamber through an inlet pipe, and the exhaust gas is discharged from the chamber to an outside through a tail pipe. An inside of the chamber is partitioned into a pair of left and right spaces by a first partition wall, and one of the pair of left and right spaces is partitioned into a pair of front and rear spaces by a second partition wall. The other of the pair of left and right spaces serves as a first expansion chamber into which the inlet pipe enters, a rear space of the pair of front and rear spaces serves as a second expansion chamber disposed downstream of the first expansion chamber, and a front space of the pair of front and rear spaces serves as a third expansion chamber disposed downstream of the second expansion chamber, the tail pipe enters into the front space. In this way, inside the chamber, the first expansion chamber, and the second and third expansion chambers are separately formed on left and right sides, and the second expansion chamber and the third expansion chamber are separately formed on front and rear sides. A flow direction of the exhaust gas from the first expansion chamber to the second expansion chamber intersects with a flow direction of the exhaust gas from the second expansion chamber to the third expansion chamber. The exhaust gas is unlikely to directly flow from the first expansion chamber to the third expansion chamber, and the exhaust gas can be sufficiently expanded in the first to third expansion chambers. Even when the chamber is disposed in a limited space below the engine, the first to third expansion chambers are formed inside the chamber, so that the exhaust gas can be expanded stepwise to improve a silencing performance of the chamber.

Figure 1:
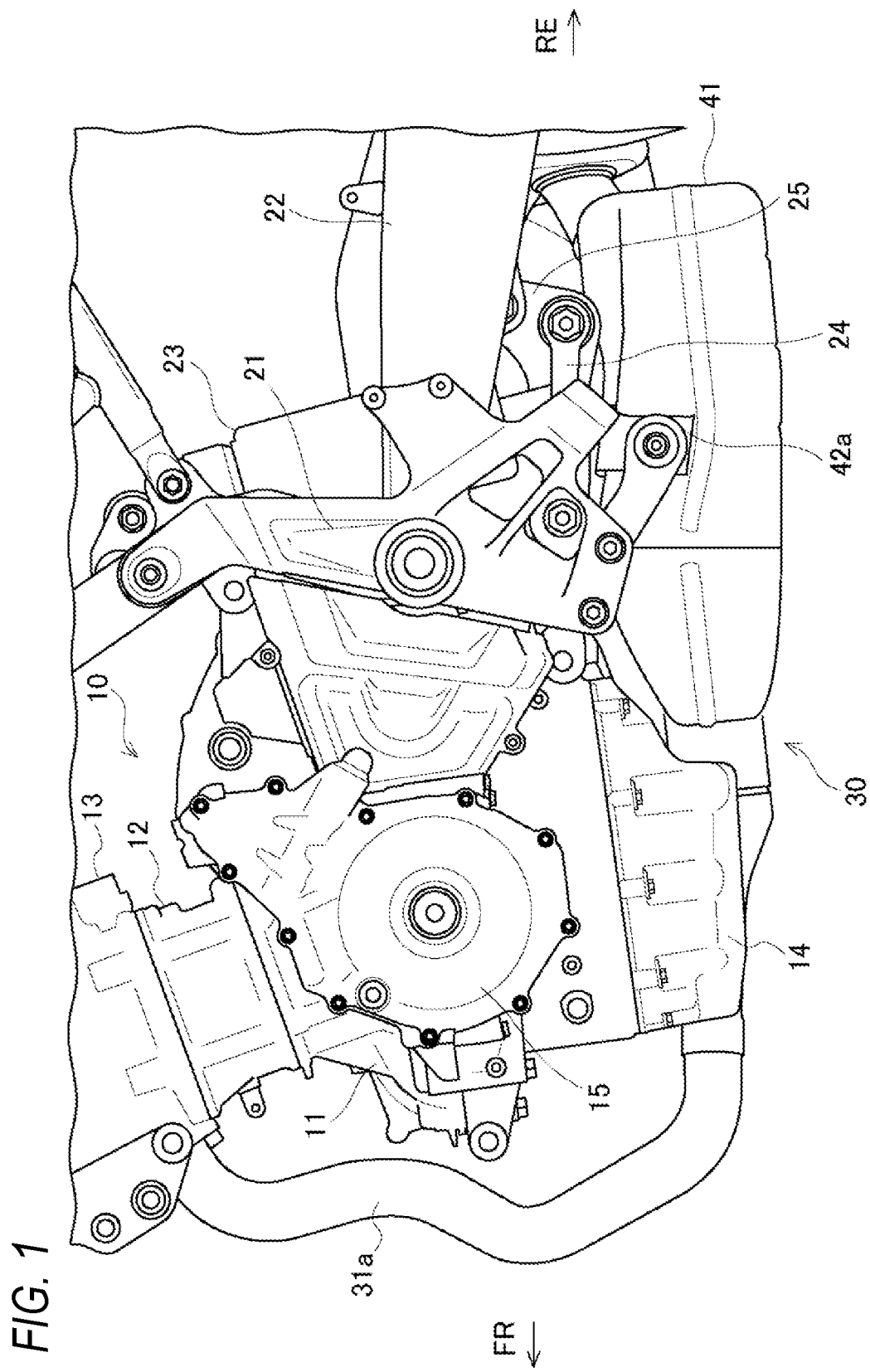
FIG. 1 is a left side view of a vicinity of an engine of the present embodiment.
Figure 2:
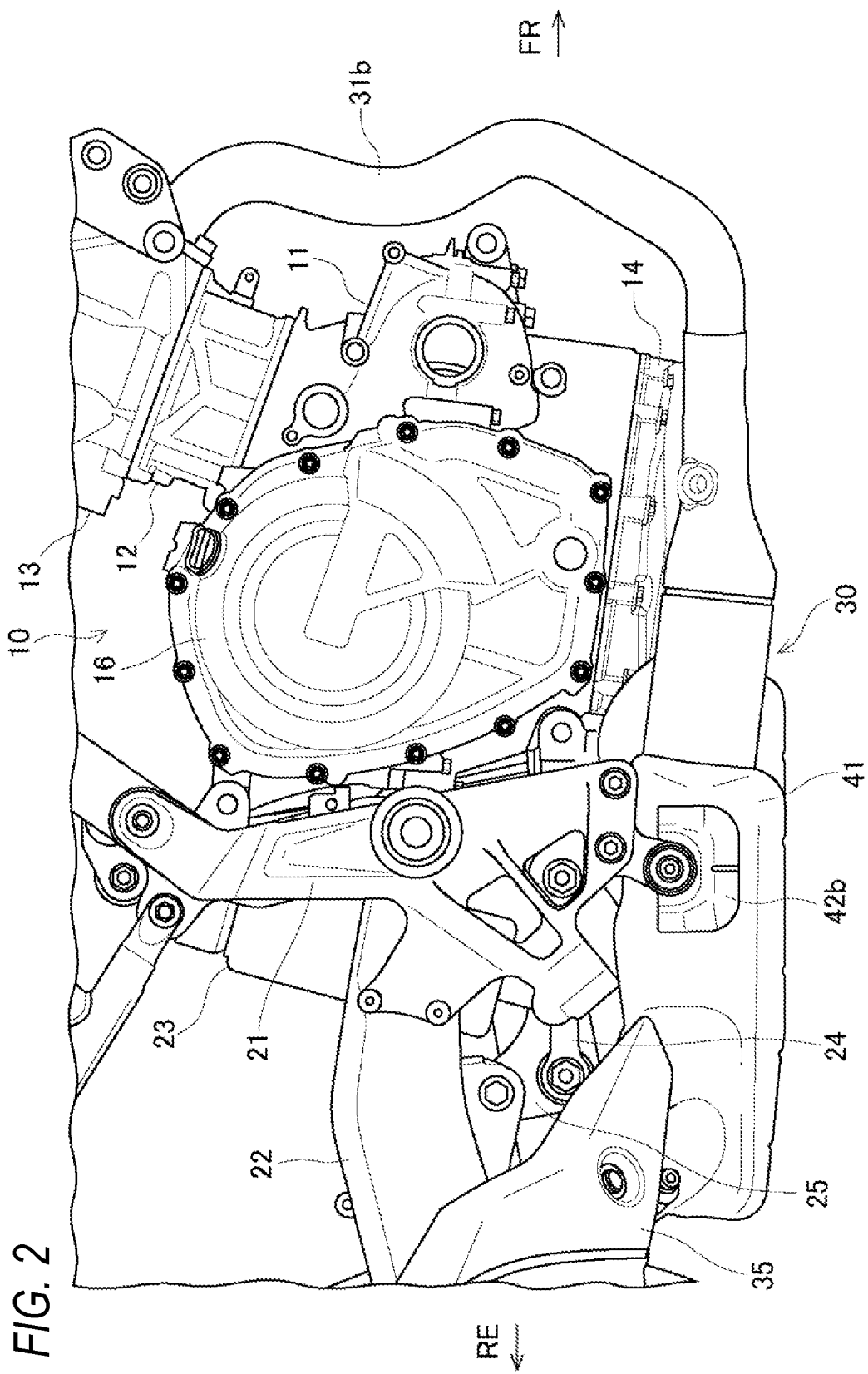
FIG. 2 is a right side view of a vicinity of the engine of the present embodiment.

Hereinafter, the present embodiment will be described in detail with reference to the accompanying drawings. FIG. 1 is a left side view of a vicinity of an engine of the present embodiment. FIG. 2 is a right side view of a vicinity of the engine of the present embodiment. Further, in the following drawings, an arrow FR indicates a vehicle front side, an arrow RE indicates a vehicle rear side, an arrow L indicates a vehicle left side, and an arrow R indicates a vehicle right side.

As shown in FIGS. 1 and 2, an engine 10 is a parallel two-cylinder engine in which a cylinder block 12 is disposed on an upper portion of a crankcase 11. A cylinder head 13 is attached to an upper portion of the cylinder block 12, and a head cover (not shown) is attached to an upper portion of the cylinder head 13. An oil pan 14 in which oil for lubrication and cooling is stored is attached to a lower portion of the crankcase 11. A magneto cover 15 that covers a magneto chamber in the case is attached to a left side surface of the crankcase 11, and a clutch cover 16 that covers a clutch chamber in the case is attached to a right side surface of the crankcase 11.

The engine 10 is supported by a pair of left and right main frames 21 of a straddle-type vehicle. A swing arm 22 that supports a rear wheel (not shown) is swingably supported by the pair of main frames 21. The swing arm 22 is connected to a rear suspension 23 for shock-absorbing the rear wheel. An upper end of the rear suspension 23 is connected to the main frames 21, and a lower end of the rear suspension 23 is connected to the swing arm 22 via a link arm 24 and a link bracket 25. Further, a chamber 41 of an exhaust apparatus 30 is supported by lower portions of the pair of main frames 21 via left and right brackets 42a and 42b.

Exhaust gas flows into the chamber 41 through a pair of exhaust pipes 31a and 31b, and the exhaust gas is exhausted to an outside from the chamber 41 through a muffler 35. A plurality of expansion chambers are formed inside the chamber 41, and energy of an exhaust sound is attenuated by the exhaust gas expanding stepwise in each expansion chamber. However, since the chamber 41 is disposed in a limited space below the engine 10, it is difficult to secure a plurality of wide expansion chambers inside the chamber 41. Therefore, in the chamber 41 of the present embodiment, the exhaust gas is unlikely to directly flow among the plurality of expansion chambers, and the exhaust gas is sufficiently expanded in each expansion chamber to improve silencing performance.

Figure 3:
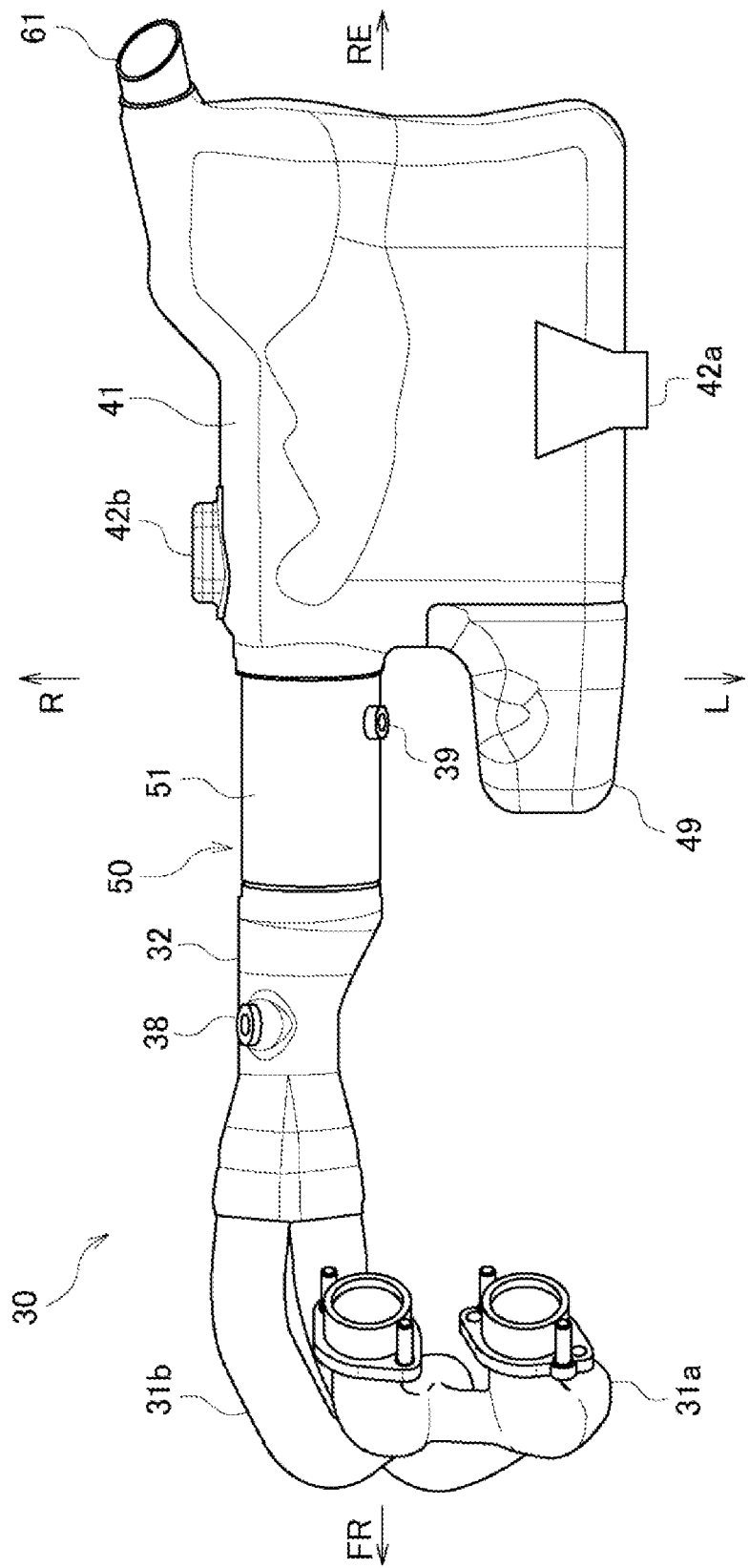
FIG. 3 is a top view of an exhaust apparatus of the present embodiment.
Figure 4:
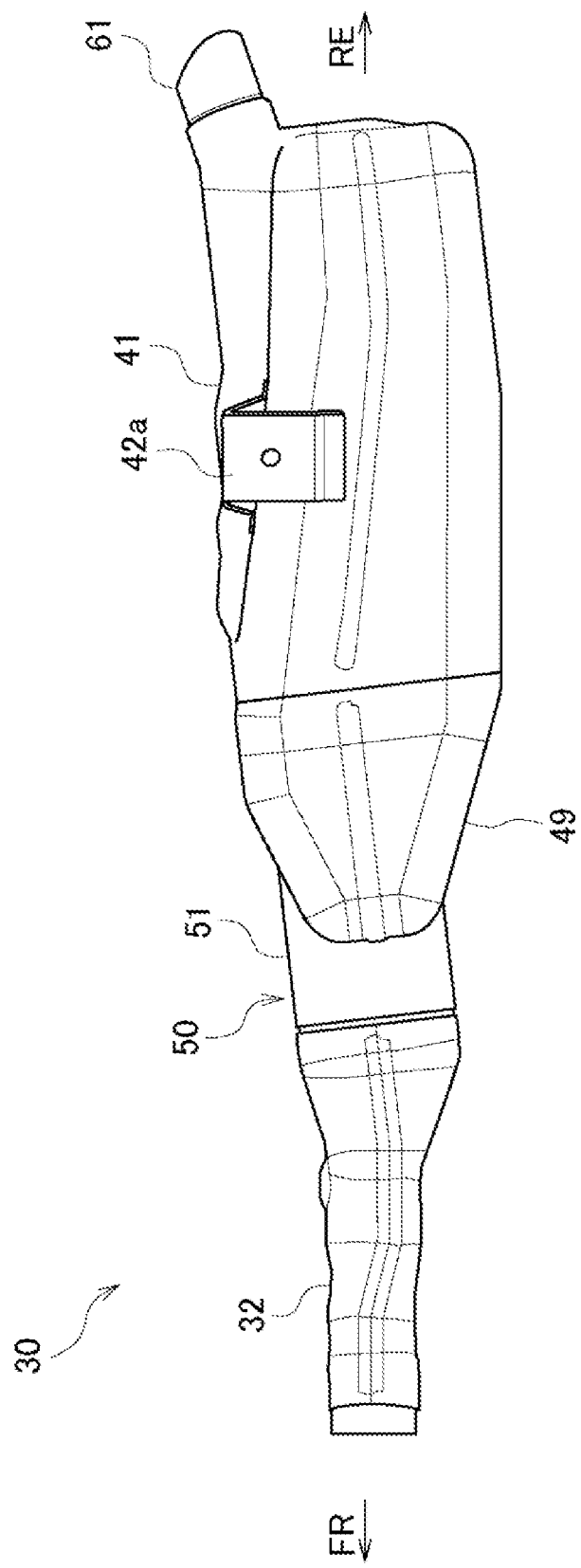
FIG. 4 is a side view of the exhaust apparatus of the present embodiment.
Figure 5:
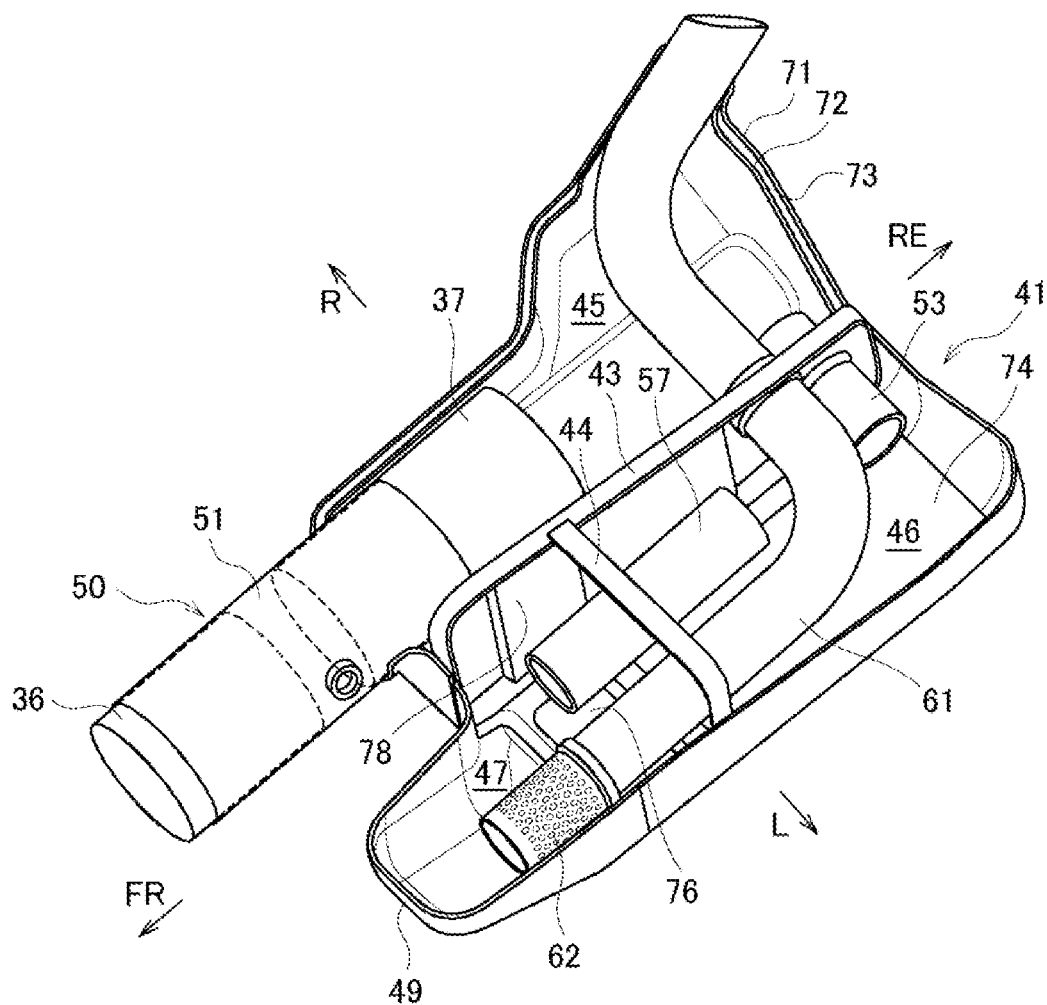
FIG. 5 is a perspective view showing an internal structure of a chamber of the present embodiment.
Figure 6:
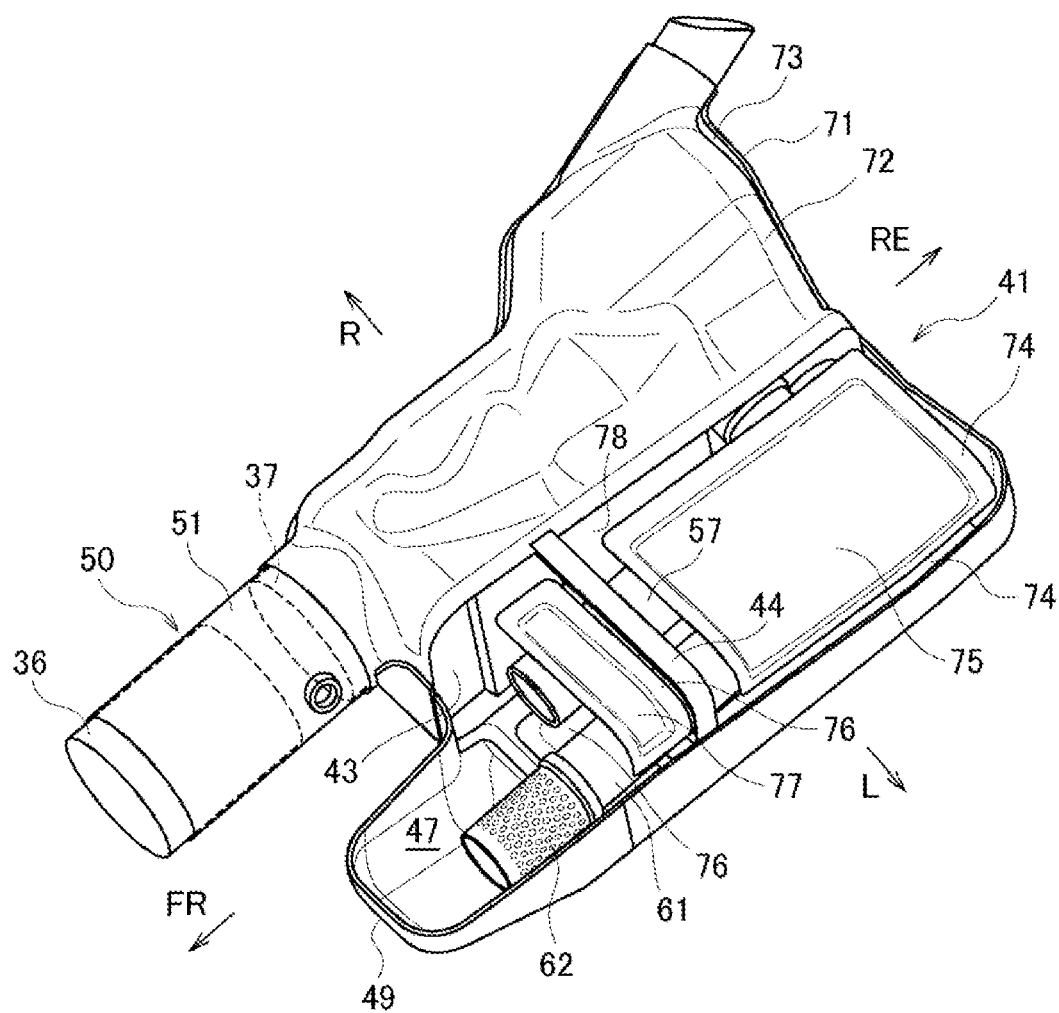
FIG. 6 is a perspective view of the chamber from which an upper outer body of the present embodiment is removed.

Hereinafter, a detailed configuration of the exhaust apparatus will be described with reference to FIGS. 3 to 6. FIG. 3 is a top view of the exhaust apparatus of the present embodiment. FIG. 4 is a side view of the exhaust apparatus of the present embodiment. FIG. 5 is a perspective view showing an internal structure of the chamber of the present embodiment. FIG. 6 is a perspective view of the chamber from which an upper outer body of the present embodiment is removed.

As shown in FIGS. 3 and 4, the exhaust apparatus 30 reduces the exhaust sound of the exhaust gas exhausted from the engine 10 (see FIG. 1) through the exhaust pipes 31a and 31b, and purifies the exhaust gas. The exhaust pipes 31a and 31b extend downward from a front surface of the engine 10, and the exhaust pipes 31a and 31b are collected by a collecting pipe 32 and connected to an inlet pipe 50. An attachment boss 38 for an upstream exhaust gas sensor (not shown) is formed on an outer peripheral surface of the collecting pipe 32. The upstream exhaust gas sensor detects an average oxygen concentration of the exhaust gas that flows in from the exhaust pipes 31a and 31b. A detection result of the upstream exhaust gas sensor is used for feedback control of a fuel injection amount.

The inlet pipe 50 connects a first catalyst 36 and a second catalyst 37 (see FIG. 5) via a connection pipe 51. An upstream side of the connection pipe 51 is outside the chamber 41, and the first catalyst 36 is disposed on the upstream side of the connection pipe 51. A downstream side of the connection pipe 51 enters the chamber 41, and the second catalyst 37 is disposed on the downstream side of the connection pipe 51. An attachment boss 39 for a downstream exhaust gas sensor (not shown) is formed between the first catalyst 36 and the second catalyst 37 on an outer peripheral surface of the connection pipe 51. The downstream exhaust gas sensor detects the average oxygen concentration of the exhaust gas that flows in from the exhaust pipes 31a and 31b. A detection result of the downstream exhaust gas sensor is used for the feedback control of the fuel injection amount and diagnosis of catalyst deterioration.

When the exhaust gas flows into the inlet pipe 50 from the exhaust pipes 31a and 31b, air pollutants such as carbon monoxide (CO), hydrocarbons (HC), and nitrogen oxides (NOx) contained in the exhaust gas are purified by the first and second catalysts 36 and 37. Further, the exhaust gas flows into the chamber 41 from the inlet pipe 50, so that the exhaust gas is expanded in each expansion chamber in the chamber 41, and the exhaust sound is reduced. The muffler 35 (see FIG. 2) is connected to a downstream side of the chamber 41 via a tail pipe 61, and the exhaust gas that has passed through the chamber 41 is exhausted to an outside from the muffler 35. Since the exhaust sound is reduced in the chamber 41, an expansion chamber of the muffler 35 is reduced in size, so that a reduction in size of the muffler 35 is implemented.

The chamber 41 is positioned below the engine 10 and behind the oil pan 14 (see FIG. 1). The chamber 41 has a box shape, the inlet pipe 50 is inserted into a right side of a front wall of the chamber 41, and the tail pipe 61 extends rearward from a right side of a rear wall of the chamber 41. The exhaust gas is guided to the chamber 41 from the exhaust pipes 31a and 31b by the inlet pipe 50, and the exhaust gas is discharged to the outside from the chamber 41 by the tail pipe 61. Further, the brackets 42a and 42b are provided on both left and right side walls of the chamber 41, and the chamber 41 is attached to lower portions of the main frames 21 (see FIG. 1) via the brackets 42a and 42b.

As shown in FIG. 5, an inside of the chamber 41 is partitioned into a pair of left and right spaces by a first partition wall 43 that extends in a front-rear direction. Further, the left space of the pair of left and right spaces is partitioned into a pair of front and rear spaces by a second partition wall 44 that extends in a left-right direction. The right space of the pair of left and right spaces is a first expansion chamber 45 into which the inlet pipe 50 enters. The rear space of the pair of front and rear spaces is a second expansion chamber 46 downstream of the first expansion chamber 45. The front space of the pair of front and rear spaces is a third expansion chamber 47 into which the tail pipe 61 enters downstream of the second expansion chamber 46.

In this way, a rear side of the first expansion chamber 45 and the second expansion chamber 46 are adjacent to each other in the left-right direction, and a front side of the first expansion chamber 45 and the third expansion chamber 47 are adjacent to each other in the left-right direction. Further, the first expansion chamber 45 is formed to have the largest volume, the second expansion chamber 46 is formed to have the second largest volume, and the third expansion chamber 47 is formed to have the smallest volume. The inlet pipe 50 is provided on the front wall of the chamber 41, the first catalyst 36 on an upstream side of the inlet pipe 50 is disposed outside the chamber 41, and the second catalyst 37 on a downstream side of the inlet pipe 50 is disposed inside the chamber 41. The second catalyst 37 is disposed parallel to the first partition wall 43 in the first expansion chamber 45.

A straight first communication pipe 53 is provided on a rear end side of the first partition wall 43, and a straight second communication pipe 57 is provided on a right end side (the other side in the left-right direction) of the second partition wall 44. The first communication pipe 53 extends in the left-right direction and penetrates the first partition wall 43, and the first expansion chamber 45 and the second expansion chamber 46 communicate with each other through the first communication pipe 53. The second communication pipe 57 extends in the front-rear direction and penetrates the second partition wall 44, and the second expansion chamber 46 and the third expansion chamber 47 communicate with each other through the second communication pipe 57. Inside the chamber 41, extending directions of the first and second communication pipes 53 and 57 are arranged so as to intersect each other.

The tail pipe 61 bent in a substantially crank shape is provided on a left end side (one side in the left-right direction) of the second partition wall 44. The tail pipe 61 extends in the front-rear direction on a left side of the second communication pipe 57 and penetrates the second partition wall 44, then extends in the left-right direction in front of the first communication pipe 53 and penetrates the first partition wall 43, and further extends obliquely rearward to a right side and penetrates the rear wall of the chamber 41. That is, the tail pipe 61 extends in the front-rear direction from the third expansion chamber 47 to the second expansion chamber 46, extends in the left-right direction from the second expansion chamber 46 to the first expansion chamber 45, and extends to an outside of the chamber 41 from a right corner of the rear wall of the first expansion chamber 45.

A bottomed tubular cap 62 is mounted on a front end of the tail pipe 61. A front end of the cap 62 is closed, and numerous punched holes are formed in an outer peripheral surface of the cap 62. An inlet of the tail pipe 61 is formed by the numerous punched holes. A bulge portion 49 that expands the third expansion chamber 47 forward is formed on a left side of the front wall of the chamber 41, and the cap 62 of the tail pipe 61 is positioned inside the bulge portion 49. Since the inlet of the tail pipe 61 has the punched holes of the cap 62, the inlet of the tail pipe 61 is narrowed, so that the exhaust gas is easily retained inside the bulge portion 49.

As shown in FIGS. 5 and 6, a right half portion of an outer wall of the chamber 41 has a two-layer structure in which a sound-absorbing material 73 is filled between the outer body 71 and an inner body 72, and a left half portion of the outer wall of the chamber 41 has a single-layer structure of the outer body 71. The first expansion chamber 45 is surrounded by the outer wall of the two-layer structure, and the second expansion chamber 46 and the third expansion chamber 47 are surrounded by the outer wall of the single-layer structure. A pair of upper and lower large plates 74 that cover the outer body 71 from an inside are arranged in the second expansion chamber 46, and a pair of upper and lower small plates 76 that cover the outer body 71 from the inside are arranged in the third expansion chamber 47.

The upper large plate 74 extends from an upper surface to a left side surface of the second expansion chamber 46, and the lower large plate 74 extends from a lower surface to the left side surface of the second expansion chamber 46. The upper small plate 76 extends from an upper surface to a left side surface of the third expansion chamber 47, and the lower small plate 76 extends from a lower surface to the left side surface of the third expansion chamber 47. Shallow recesses 75 and 77 are formed in surfaces of the large plate 74 and the small plate 76, and sound-absorbing materials (not shown) are filled in the recesses 75 and 77. Although not shown in the drawings, numerous punched holes are formed in the large plate 74 and the small plate 76.

A partition wall plate 78 is attached to a left side surface of the first partition wall 43 in a predetermined range from a rear end of the second catalyst 37 to a front side of the tail pipe 61. A sound-absorbing material (not shown) is filled between the first partition wall 43 and the partition wall plate 78. In this way, the first expansion chamber 45 having the largest volume is formed by the outer wall and the partition wall of the two-layer structure, and the second and third expansion chambers 46 and 47 are also partially formed by the outer wall and the partition wall of the two-layer structure. Therefore, silencing performance can be improved without increasing a size of the chamber 41. Further, by minimizing the two-layer structure, an increase in weight is prevented and heat is unlikely to be retained. As the sound-absorbing material 73, for example, glass wool is used.

Figure 7:
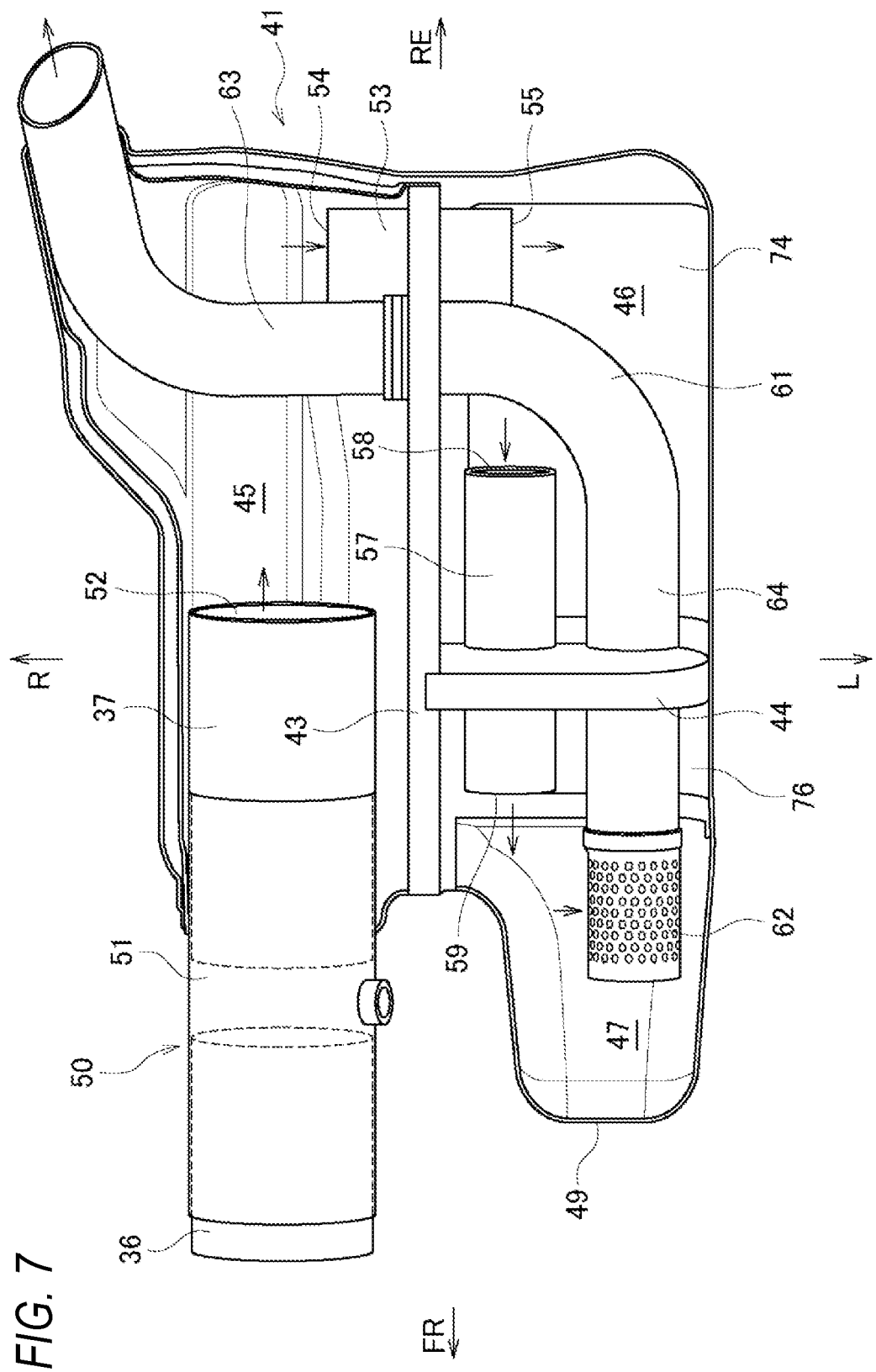
FIG. 7 is a top view showing the internal structure of the chamber of the present embodiment.
Figure 8:
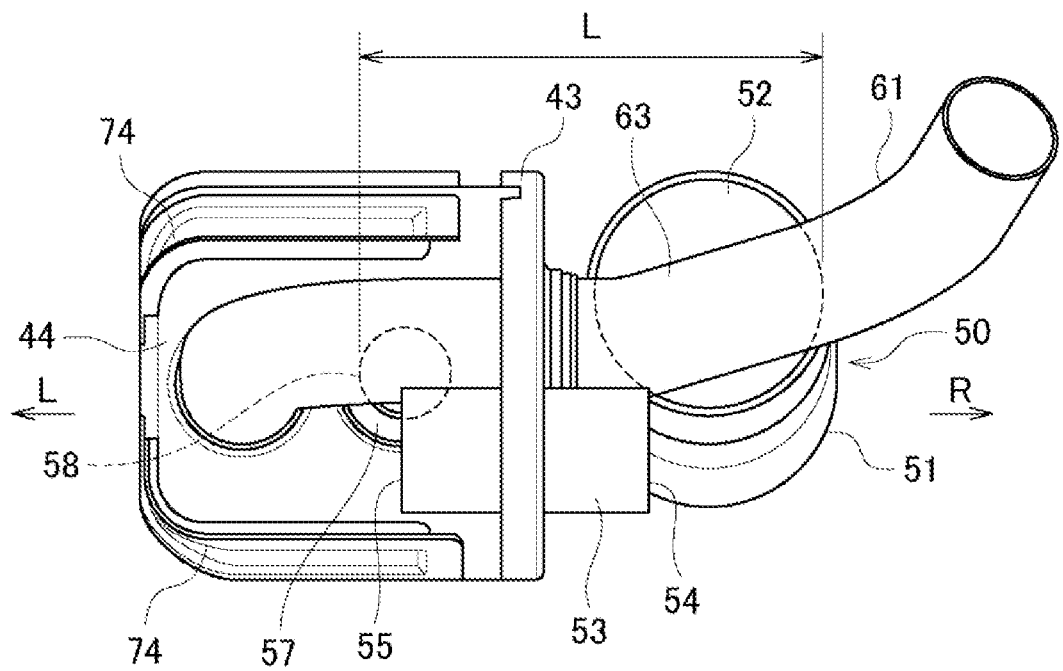
FIG. 8 is a rear view showing the internal structure of the chamber of the present embodiment.

Hereinafter, positional relationship of the members inside the chamber will be described with reference to FIGS. 7 and 8. FIG. 7 is a top view showing the internal structure of the chamber of the present embodiment. FIG. 8 is a rear view showing the internal structure of the chamber of the present embodiment.

As shown in FIG. 7, the first expansion chamber 45 is formed in a right half portion of the chamber 41, the second expansion chamber 46 is formed on a rear side of a left half portion of the chamber 41, and the third expansion chamber 47 is formed on a front side of the left half portion of the chamber 41. An outlet 52 of the inlet pipe 50 (second catalyst 37) is positioned in a middle of the first expansion chamber 45 in the front-rear direction, and an inlet 54 of the first communication pipe 53 is positioned on a rear side of the first expansion chamber 45. An outlet 55 of the first communication pipe 53 is positioned on a rear side of the second expansion chamber 46, and an inlet 58 of the second communication pipe 57 is positioned in a middle of the second expansion chamber 46 in the front-rear direction. An outlet 59 of the second communication pipe 57 is positioned on a rear side of the third expansion chamber 47, and the cap 62 of the tail pipe 61 is positioned inside the bulge portion 49.

The exhaust gas flows into the first expansion chamber 45 from the outlet 52 of the inlet pipe 50, and the exhaust gas flows into the inlet 54 of the first communication pipe 53 from the first expansion chamber 45. The inlet pipe 50 is inclined so as to become higher toward a rear side, and an extending portion 63 of the tail pipe 61 in the left-right direction overlaps the outlet 52 of the inlet pipe 50 in front of the first communication pipe 53 in a rear view (see FIG. 8). A flow of the exhaust gas is blocked by the extending portion 63 of the tail pipe 61 in the left-right direction in front of the first communication pipe 53, so that the exhaust gas is unlikely to directly flow from the outlet 52 of the inlet pipe 50 to the inlet 54 of the first communication pipe 53. Therefore, the exhaust gas is likely to sufficiently expand in the first expansion chamber 45.

In a rear view, the inlet 54 of the first communication pipe 53 is positioned below the extending portion 63 of the tail pipe 61 in the left-right direction (see FIG. 8), and the outlet 52 of the inlet pipe 50 and the inlet 54 of the first communication pipe 53 are displaced in an upper-lower direction. Further, directions of the inlet pipe 50 and the first communication pipe 53 intersect with each other, and the first communication pipe 53 partially overlaps the outlet 52 of the inlet pipe 50 in the first expansion chamber 45 in a rear view (see FIG. 8). Accordingly, the exhaust gas is unlikely to directly flow from the outlet 52 of the inlet pipe 50 to the inlet 54 of the first communication pipe 53, and the exhaust gas is more likely to expand in the first expansion chamber 45.

The exhaust gas flows into the second expansion chamber 46 from the outlet 55 of the first communication pipe 53, and the exhaust gas flows into the inlet 58 of the second communication pipe 57 from the second expansion chamber 46. The second communication pipe 57 has substantially the same height as that of the extending portion 63 of the tail pipe 61 in the left-right direction, and the extending portion 63 of the tail pipe 61 in the left-right direction overlaps the inlet 58 of the second communication pipe 57 in front of the first communication pipe 53 in a rear view (see FIG. 8). The flow of the exhaust gas is blocked by the extending portion 63 of the tail pipe 61 in the left-right direction in front of the first communication pipe 53, and the exhaust gas is unlikely to directly flow from the outlet 55 of the first communication pipe 53 to the inlet 58 of the second communication pipe 57. Therefore, the exhaust gas is likely to sufficiently expand in the second expansion chamber 46.

In a rear view, the outlet 55 of the first communication pipe 53 is positioned below the extending portion 63 of the tail pipe 61 in the left-right direction (see FIG. 8), and the outlet 55 of the first communication pipe 53 and the inlet 58 of the second communication pipe 57 are displaced in the upper-lower direction. Further, directions of the first communication pipe 53 and the second communication pipe 57 intersect with each other, and the first communication pipe 53 overlaps the inlet 58 of the second communication pipe 57 in the second expansion chamber 46 in a rear view (see FIG. 8). Accordingly, the exhaust gas is unlikely to directly flow from the outlet 55 of the first communication pipe 53 to the inlet 58 of the second communication pipe 57, and the exhaust gas is more likely to expand in the second expansion chamber 46.

The exhaust gas flows into the third expansion chamber 47 from the outlet 59 of the second communication pipe 57, and the exhaust gas flows into the cap 62 of the tail pipe 61 from the third expansion chamber 47. As described above, the second communication pipe 57 is provided on the right end side of the second partition wall 44, and an extending portion 64 of the tail pipe 61 in the front-rear direction is provided on the left end side of the second partition wall 44. The front wall of the chamber 41 is formed with the bulge portion 49, the outlet 59 of the second communication pipe 57 faces a foot portion of the bulge portion 49, and the cap 62 of the tail pipe 61 faces a top portion of the bulge portion 49. Therefore, the exhaust gas from the outlet 59 of the second communication pipe 57 is diffused not only to an inside of the bulge portion 49 but also to a wide range.

The outlet 59 of the second communication pipe 57 is positioned on the rear side of the third expansion chamber 47, and the cap 62 of the tail pipe 61 is positioned on an inner side of the bulge portion 49 in front of the outlet 59 of the second communication pipe 57. The second communication pipe 57 and the extending portion 64 of the tail pipe 61 in the front-rear direction extend in parallel to each other, and the outlet 59 of the second communication pipe 57 and the cap 62 of the tail pipe 61 are displaced in the front-rear direction. The exhaust gas is unlikely to directly flow from the outlet 59 of the second communication pipe 57 to the cap 62 of the tail pipe 61, and the exhaust gas is likely to expand in the third expansion chamber 47. Since the cap 62 is positioned on the inner side of the bulge portion 49, the volume of the bulge portion 49 is effectively utilized for expansion of the exhaust gas.

In this way, the exhaust gas is unlikely to directly flow from the first expansion chamber 45 to the second expansion chamber 46, the exhaust gas is unlikely to directly flow from the second expansion chamber 46 to the third expansion chamber 47, and the exhaust gas is unlikely to directly flow from the third expansion chamber 47 to the tail pipe 61. The exhaust gas is sufficiently expanded in the first to third expansion chambers 45 to 47, and the silencing performance of the chamber 41 is improved. Since the exhaust gas is expanded stepwise in the first to third expansion chambers 45 to 47 and the energy of the exhaust sound is fairly attenuated, the chamber 41 can be disposed in the narrow space below the engine 10.

The inlet pipe 50 and the second communication pipe 57 extend parallel to the extending portion 64 of the tail pipe 61 in the front-rear direction, and the first communication pipe 53 extends parallel to the extending portion 63 of the tail pipe 61 in the left-right direction. The extending portion 63 of the tail pipe 61 in the left-right direction crosses the inlet pipe 50 and the second communication pipe 57 in front of the first communication pipe 53. The first communication pipe 53 is formed to be shorter than a distance L from a left end of the second communication pipe 57 to a right end of the inlet pipe 50 (second catalyst 37) (see FIG. 8). The extending portion 63 of the tail pipe 61 in the left-right direction is formed to be longer than the distance L from the left end of the second communication pipe 57 to the right end of the inlet pipe 50 (second catalyst 37) in the left-right direction (see FIG. 8).

As described above, in the first expansion chamber 45 and the second expansion chamber 46, the flow of the exhaust gas is blocked by the extending portion 63 of the tail pipe 61 in the left-right direction in front of the first communication pipe 53. The exhaust gas is unlikely to directly flow from the outlet 52 of the inlet pipe 50 to the inlet 54 of the first communication pipe 53, and the exhaust gas is unlikely to directly flow from the outlet 55 of the first communication pipe 53 to the inlet 58 of the second communication pipe 57. Therefore, the exhaust gas can be sufficiently expanded in the first and second expansion chambers 45 and 46, and the silencing performance of the chamber 41 can be improved. The tail pipe 61 functions as a barrier that blocks the flow of the exhaust gas in the first and second expansion chambers 45 and 46.

The first expansion chamber 45 is entirely surrounded by the outer wall of the two-layer structure, and the second and third expansion chambers 46 and 47 are partially surrounded by the outer wall of the two-layer structure. The large plates 74 of the second expansion chamber 46 are arranged so as to overlap an outlet 55 side of the first communication pipe 53 and an inlet 58 side of the second communication pipe 57 in a plan view. The outlet 55 of the first communication pipe 53 faces a side surface portion of the lower large plate 74 (see FIG. 8). The small plates 76 of the third expansion chamber 47 are arranged so as to overlap an outlet 59 side of the second communication pipe 57 behind the bulge portion 49 in a plan view. A vicinity of the communication pipes 53 and 57 in which the exhaust gas is concentrated is formed in a two-layer structure, so that the silencing effect of the chamber 41 is enhanced.

As described above, according to the present embodiment, inside the chamber 41, the first expansion chamber 45 and the second and third expansion chambers 46 and 47 are separately formed on left and right sides, and the second expansion chamber 46 and the third expansion chamber 47 are separately formed on front and rear sides. A flow direction of the exhaust gas from the first expansion chamber 45 to the second expansion chamber 46 intersects with a flow direction of the exhaust gas from the second expansion chamber 46 to the third expansion chamber 47. The exhaust gas is unlikely to directly flow from the first expansion chamber 45 to the third expansion chamber 47, and the exhaust gas can be sufficiently expanded in the first to third expansion chambers 45 to 47. Even when the chamber 41 is disposed in the limited space below the engine 10, the first to third expansion chambers 45 to 47 are formed inside the chamber 41, so that the exhaust gas can be expanded stepwise to improve the silencing performance of the chamber 41.

The first expansion chamber is formed on the right side of the chamber and the second and third expansion chambers are formed on the left side of the chamber in the present embodiment, but the first expansion chamber may be formed on the left side of the chamber and the second and third expansion chambers may be formed on the right side of the chamber.

In the present embodiment, the first communication pipe extends in the left-right direction, but the first communication pipe may communicate the first expansion chamber with the second expansion chamber. For example, the first communication pipe may extend obliquely.

In the present embodiment, the second communication pipe extends in the front-rear direction, but the second communication pipe may communicate the second expansion chamber with the third expansion chamber. For example, the second communication pipe may extend obliquely.

In the present embodiment, the outer wall of the chamber that surrounds the second and third expansion chambers partially has the two-layer structure, but the outer wall of the chamber that surrounds the second and third expansion chambers may have a single-layer structure as a whole. Further, the outer wall of the chamber may have a two-layer structure or a single-layer structure as a whole.

In the present embodiment, the partition wall plate is attached to the first partition wall in a predetermined range from the rear end of the second catalyst to the front side of the tail pipe, but the predetermined range in which the partition wall plate is attached can be appropriately changed. For example, the partition wall plate may be attached to the first partition wall in a predetermined range from a position in front of the inlet pipe to a position in front of the first communication pipe.

In the present embodiment, the extending portion of the tail pipe in the left-right direction is disposed in the first and second expansion chambers, but the tail pipe may not be disposed in the first and second expansion chambers. For example, the tail pipe may extend from the third expansion chamber to the outside of the chamber.

The bulge portion is formed in the chamber in the present embodiment, but the bulge portion may not be formed in the chamber as long as a volume of the third expansion chamber can be sufficiently secured.

In the present embodiment, the inlet of the tail pipe is formed by the punched holes of the cap, but the inlet of the tail pipe is not particularly limited as long as the inlet has a shape that enables the exhaust gas to flow in.

The exhaust apparatus of the present embodiment can be appropriately applied to other straddle-type vehicles such as a buggy-type automatic three-wheeled vehicle. Here, the straddle-type vehicle is not limited to a general vehicle on which a rider drives the vehicle in a posture of straddling a seat, and further includes a scooter-type vehicle on which a rider drives the vehicle without straddling a seat.

As described above, an exhaust apparatus (30) of the present embodiment is an exhaust apparatus configured to purify exhaust gas exhausted from an engine (10) through an exhaust pipe (31a, 31b), the exhaust apparatus (30) including: a chamber (41) disposed below the engine; an inlet pipe (50) configured to guide exhaust gas from the exhaust pipe to the chamber; a tail pipe (61) configured to discharge exhaust gas from the chamber to an outside; a first partition wall (43) configured to partition an inside of the chamber into a pair of left and right spaces; and a second partition wall (44) configured to partition one of the pair of left and right spaces into a pair of front and rear spaces, in which the other of the pair of left and right spaces is defined as a first expansion chamber (45) into which the inlet pipe enters, in which a rear space of the pair of front and rear spaces is defined as a second expansion chamber (46) downstream of the first expansion chamber, and in which a front space of the pair of front and rear spaces is defined as a third expansion chamber (47) into which the tail pipe enters downstream of the second expansion chamber. According to this configuration, inside the chamber, the first expansion chamber, and the second and third expansion chambers are separately formed on the left and right sides, and the second expansion chamber and the third expansion chamber are separately formed on the front and rear sides. The flow direction of the exhaust gas from the first expansion chamber to the second expansion chamber intersects with the flow direction of the exhaust gas from the second expansion chamber to the third expansion chamber. The exhaust gas is unlikely to directly flow from the first expansion chamber to the third expansion chamber, and the exhaust gas can be sufficiently expanded in the first to third expansion chambers. Even when the chamber is disposed in the limited space below the engine, the first to third expansion chambers are formed inside the chamber, so that the exhaust gas can be expanded stepwise to improve the silencing performance of the chamber.

The exhaust apparatus of the present embodiment further including: a first communication pipe (53) configured to extend in a left-right direction and penetrate the first partition wall; and a second communication pipe (57) configured to extend in a front-rear direction and penetrate the second partition wall, in which the first expansion chamber and the second expansion chamber communicate with each other through the first communication pipe, in which the second expansion chamber and the third expansion chamber communicate with each other through the second communication pipe, and in which the first communication pipe overlaps an inlet (58) of the second communication pipe in a rear view. According to this configuration, the directions of the first communication pipe and the second communication pipe intersect with each other, and the exhaust gas is unlikely to directly flow from the outlet of the first communication pipe to the inlet of the second communication pipe. Therefore, the exhaust gas can be sufficiently expanded in the second expansion chamber, and the silencing performance of the chamber can be improved.

In the exhaust apparatus of the present embodiment, the tail pipe extends in the front-rear direction and penetrates the second partition wall, then extends in the left-right direction and penetrates the first partition wall, and an extending portion (63) of the tail pipe in the left-right direction overlaps the inlet of the second communication pipe in front of the first communication pipe in a rear view. According to this configuration, the flow of the exhaust gas is blocked by the extending portion of the tail pipe in the left-right direction in front of the first communication pipe, and the exhaust gas is unlikely to directly flow from the outlet of the first communication pipe to the inlet of the second communication pipe. Therefore, the exhaust gas can be sufficiently expanded in the second expansion chamber, and the silencing performance of the chamber can be improved.

In the exhaust apparatus of the present embodiment, the extending portion of the tail pipe in the left-right direction overlaps an outlet (52) of the inlet pipe in front of the first communication pipe in a rear view. According to this configuration, the flow of the exhaust gas is blocked by the extending portion of the tail pipe in the left-right direction in front of the first communication pipe, and the exhaust gas is unlikely to directly flow from the outlet of the inlet pipe to the inlet of the first communication pipe. Therefore, the exhaust gas can be sufficiently expanded in the first expansion chamber, and the silencing performance of the chamber can be improved.

In the exhaust apparatus of the present embodiment, the extending portion of the tail pipe in the left-right direction is longer than a distance from one end of the second communication pipe in the left-right direction to the other end of the inlet pipe in the left-right direction. According to this configuration, in the first expansion chamber and the second expansion chamber, the flow of the exhaust gas is blocked by the extending portion of the tail pipe in the left-right direction in front of the first communication pipe. The exhaust gas is unlikely to directly flow from the outlet of the inlet pipe to the inlet of the first communication pipe, and the exhaust gas is unlikely to directly flow from the outlet of the first communication pipe to the inlet of the second communication pipe. Therefore, the exhaust gas can be sufficiently expanded in the first and second expansion chambers, and the silencing performance of the chamber can be improved.

In the exhaust apparatus of the present embodiment, an outer wall of the chamber is formed with a bulge portion (49) configured to expand the third expansion chamber forward, the extending portion of the tail pipe in a front-rear direction extends in parallel to the second communication pipe, and an inlet (cap 62) of the tail pipe is positioned inside the bulge portion in front of an outlet (59) of the second communication pipe. According to this configuration, the volume of the third expansion chamber can be increased by the bulge portion. The second communication pipe and the extending portion of the tail pipe in the front-rear direction extend in parallel to each other, and the exhaust gas is unlikely to directly flow from the outlet of the second communication pipe to the inlet of the tail pipe. Further, since the inlet of the tail pipe is positioned inside the bulge portion, a volume of the bulge portion can be effectively utilized to bulge the exhaust gas. Therefore, the exhaust gas can be sufficiently expanded in the third expansion chamber, and the silencing performance of the chamber can be improved.

In the exhaust apparatus of the present embodiment, an outer wall that surrounds the first expansion chamber has a two-layer structure in which a sound-absorbing material (73) is filled between an outer body (71) and an inner body (72), an outer wall that surrounds the second expansion chamber and the third expansion chamber has a single-layer structure of the outer body, and a plate (partition wall plate 78) is attached to the first partition wall in a predetermined range from a position in front of the outlet of the inlet pipe to a position in front of the first communication pipe, and a sound-absorbing material is filled between the first partition wall and the plate. According to this configuration, the outer wall and the partition wall of the chamber that form the first expansion chamber having the largest volume have the two-layer structure in which the sound-absorbing material is filled. Therefore, the silencing performance can be improved without increasing the size of the chamber. Further, by minimizing the two-layer structure, the increase in the weight is prevented and the heat is unlikely to be retained.

Although the present embodiment has been described, the above-described embodiment and the modification may be combined entirely or partially as another embodiment.

The technique of the present invention is not limited to the above-described embodiment, and various changes, substitutions, and modifications may be made without departing from the spirit of the technical idea of the present invention. Further, the present invention may be implemented using other methods as long as the technical idea can be implemented by the methods through advance of the technology or other derivative technology. Therefore, the claims cover all embodiments that may be included within the scope of the technical idea.

What is claimed is:

1. An exhaust apparatus configured to purify exhaust gas exhausted from an engine through an exhaust pipe, the exhaust apparatus comprising:
   a chamber disposed below the engine;
   an inlet pipe configured to guide exhaust gas from the exhaust pipe to the chamber;
   a tail pipe configured to discharge the exhaust gas from the chamber to an outside;
   a first partition wall partitioning an inside of the chamber to a pair of left and right spaces; and
   a second partition wall partitioning one of the pair of left and right spaces to a pair of front and rear spaces, wherein
   another of the pair of left and right spaces is defined as a first expansion chamber into which the inlet pipe enters,
   a rear space of the pair of front and rear spaces is defined as a second expansion chamber disposed downstream of the first expansion chamber,
   a front space of the pair of front and rear spaces is defined as a third expansion chamber disposed downstream of the second expansion chamber, and the tail pipe enters into the third expansion chamber,
   the exhaust apparatus includes:
      a first communication pipe extending in a left-right direction and penetrating the first partition wall; and
      a second communication pipe extending in a front-rear direction and penetrating the second partition wall,
      the first expansion chamber and the second expansion chamber communicate with each other through the first communication pipe,
      the second expansion chamber and the third expansion chamber communicate with each other through the second communication pipe, and
      the first communication pipe overlaps an inlet of the second communication pipe in a direction in which the second communication pipe extends.

2. The exhaust apparatus according to claim 1, wherein
   the tail pipe extends in the front-rear direction and penetrates the second partition wall, then extends in the left-right direction and penetrates the first partition wall, and
   an extending portion of the tail pipe in the left-right direction overlaps the inlet of the second communication pipe in front of the first communication pipe in the direction in which the second communication pipe extends.

3. The exhaust apparatus according to claim 2, wherein the extending portion of the tail pipe in the left-right direction overlaps an outlet of the inlet pipe in front of the first communication pipe in the direction in which the second communication pipe extends.

4. The exhaust apparatus according to claim 3, wherein the extending portion of the tail pipe in the left-right direction is longer than a distance from an end of the second communication pipe on a one side in the left-right direction to an end of the inlet pipe on the other side in the left-right direction.

5. The exhaust apparatus according to claim 2, wherein an outer wall of the chamber is formed with a bulge portion expanding the third expansion chamber forward, an extending portion of the tail pipe in the front-rear direction extends in parallel to the second communication pipe, and an inlet of the tail pipe is positioned inside the bulge portion in front of an outlet of the second communication pipe.

6. The exhaust apparatus according to claim 1, wherein an outer wall surrounding the first expansion chamber has a two-layer structure including an outer body and an inner body in which a sound-absorbing material is filled between the outer body and the inner body, and an outer wall surrounding the second expansion chamber and the third expansion chamber has a single-layer structure including the outer body, and a plate is attached to the first partition wall in a predetermined range from a position in front of the outlet of the inlet pipe to a position in front of the first communication pipe, and a sound-absorbing material is filled between the first partition wall and the plate.

* * * * *